April 24, 1928.

P. F. LAUWAGIE ET AL

VETERINARY IMPLEMENT

Filed June 11, 1925

1,667,325

Inventor
Peter F. Lauwagie
John P. Konings
By Watson E. Coleman.
Attorney

Patented Apr. 24, 1928.

1,667,325

UNITED STATES PATENT OFFICE.

PETER F. LAUWAGIE AND JOHN P. KONINGS, OF DELL RAPIDS, SOUTH DAKOTA.

VETERINARY IMPLEMENT.

Application filed June 11, 1925. Serial No. 36,443.

This invention relates to certain improvements in veterinary implements and has relation more particularly to a device of this kind especially designed and adapted for use to relieve cattle, milch cows and other ruminants of bloat caused from feeding on wet clover, alfalfa and the like, and it is an object of the invention to provide a device of this general character constituting an elongated tubular member provided at one end portion with spaced convolutions to permit admission of air and gas, said member being adapted to be inserted within the stomach of the animal through the esophagus.

The invention consists in the details of construction and in the combination and arrangement of the several parts of our improved veterinary implement whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1:
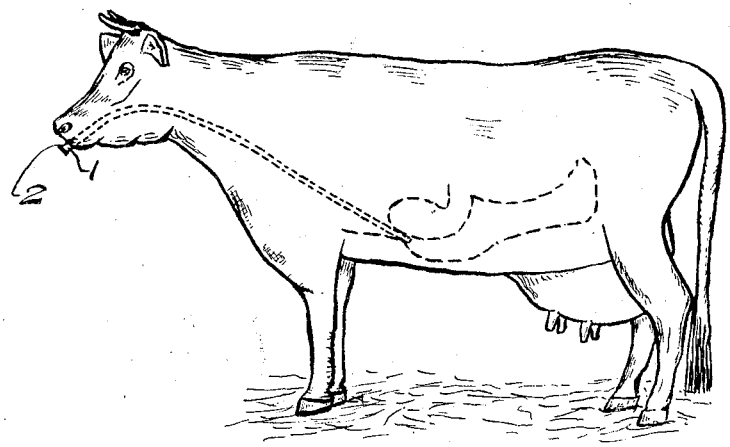
Figure 1 is a view somewhat of a diagrammatic character illustrating a device constructed in accordance with an embodiment of our invention in applied position.
Figure 2:
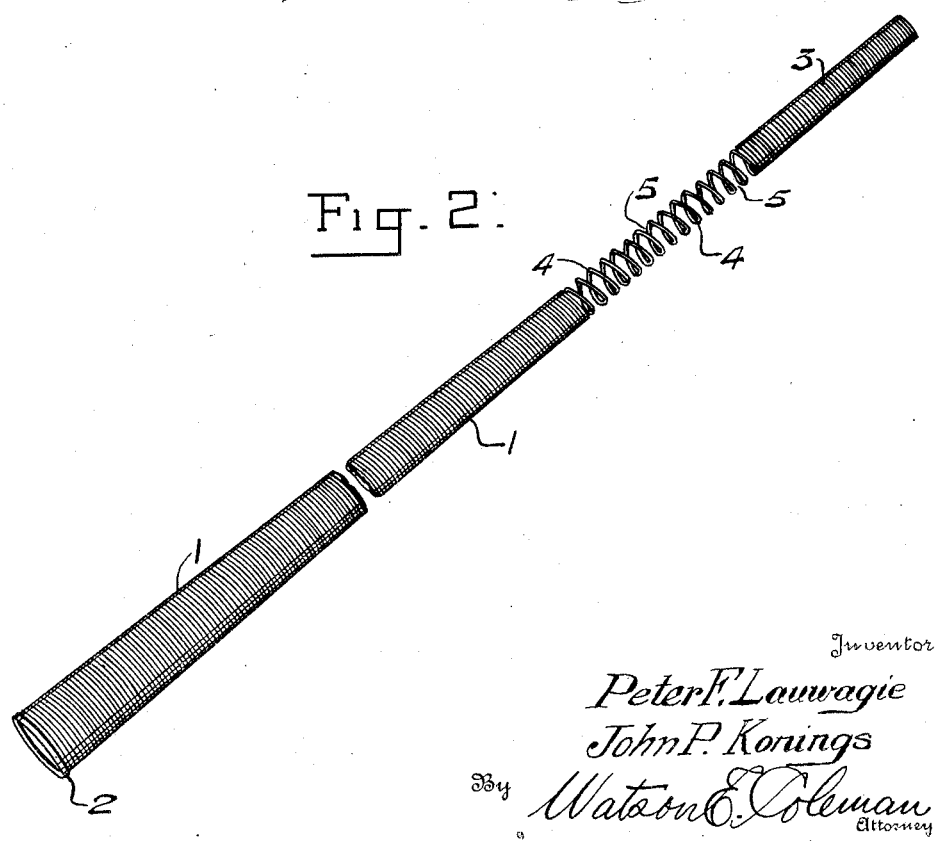
Figure 2 is an enlarged fragmentary view in perspective illustrating our improved device as herein disclosed.

As disclosed in the accompanying drawings, our improved device comprises an elongated tubular member formed of a coiled strand 1 of galvanized wire, spring pressed wire and the like, said device being tubular and gradually tapered from one end to the other. The larger end of the member is smoothly finished with a brass or galvanized shoulder or ring 2 and the convolutions of the member from said larger end to a predetermined point inwardly of the opposite or smaller end are in close contact one with the other yet permitting flexibility to the device. The smaller or tip end portion 3 of the member is also tightly wound and is open at its outer end, said smaller or tip end being of a diameter preferably about two-fifths of the diameter of the outer or larger end of the member. A portion 4 of the member immediately adjacent to the smaller or tip end 3 have the convolutions spaced apart a distance from one-eighth to one-fourth of an inch thereby providing openings 5 to permit air and gas to readily enter the member. In practice, we find it of advantage to have the member in its entirety substantially five and one-half feet in length.

Cattle and other ruminants when permitted to feed on wet clover, alfalfa and the like, or when first turned on a pasture of these grasses, are often afflicted with bloat due to an extreme pressure of gas within the stomach which affects the heart, lungs and other organs of the animals resulting in their death. The present invention is for the purpose of relieving this bloat by being inserted through the esophagus of an affected animal with the reduced or tip end portion first, until said smaller or tip end portion passes through the obstruction at the opening of the stomach, the openings 5 permitting such gas to enter the member and to escape therethrough, said gases also entering the member through the smaller or tip end of the member. The flexibility of the member from end to end permits it to readily follow down the throat and through the esophagus without injury and assuring immediate relief.

From the foregoing description it is thought to be obvious that a veterinary implement constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

A device of the class described comprising an elongated tubular member formed from a single strand of material, said member being tapered from one end toward the other, the convolutions of the strand and major portion of the length of the member being in close contact, and the convolutions of the strand at the smaller end portion being also in close contact, a portion of said convolutions inwardly of the second named portion being spaced apart to provide entrance openings, said member having its opposite ends open, the smaller end of the device being of a diameter approximately two-fifths of the larger end.

In testimony whereof we hereunto affix our signatures.

PETER F. LAUWAGIE.
JOHN P. KONINGS.